United States Patent
Seseke-Koyro et al.

(10) Patent No.: US 6,207,125 B1
(45) Date of Patent: Mar. 27, 2001

(54) RECYCLING OF FLUX MATERIAL

(75) Inventors: Ulrich Seseke-Koyro, Vellmar; Thomas Born, Holle, both of (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/317,636

(22) Filed: May 25, 1999

(30) Foreign Application Priority Data

May 28, 1998 (DE) .............................. 198 23 879

(51) Int. Cl.⁷ ........................................ C01B 7/19
(52) U.S. Cl. .................... 423/485; 423/484; 423/465; 252/183.14; 106/461
(58) Field of Search ................. 423/483, 484, 423/485, 465, 464; 148/26; 252/183.14; 106/461

(56) References Cited

U.S. PATENT DOCUMENTS

| | | |
|---|---|---|
| 3,218,125 | 11/1965 | Houston et al. . |
| 3,919,399 | 11/1975 | Schabacher et al. . |
| 4,010,245 | 3/1977 | Sreckelmeyer et al. . |
| 4,394,365 * | 7/1983 | Gnyra . |
| 4,460,551 | 7/1984 | Boese et al. . |
| 4,477,425 * | 10/1984 | Berry et al. . |
| 4,544,511 * | 10/1985 | Isshiki et al. . |
| 4,622,071 * | 11/1986 | Matsuura et al. . |
| 4,645,119 | 2/1987 | Haramaki et al. . |
| 4,670,067 | 6/1987 | Suzuki et al. . |
| 5,318,764 | 6/1994 | Meshri et al. . |
| 5,683,725 * | 11/1997 | Malik et al. . |
| 5,723,097 | 3/1998 | Barnett et al. . |
| 5,785,770 | 7/1998 | Meshri et al. . |

FOREIGN PATENT DOCUMENTS

| | | |
|---|---|---|
| 2209960 | 3/1972 | (DE) . |
| 2435512 | 7/1974 | (DE) . |
| 19636897 | 9/1996 | (DE) . |
| 19913111 | 3/1999 | (DE) . |
| 0 278 862 * | 2/1988 | (EP) . |
| 2198722 | 6/1988 | (GB) . |
| 8-267229 | 10/1996 | (JP) . |
| 540195 | 11/1973 | (SE) . |
| WO 82/03848 | 11/1982 | (WO) . |

* cited by examiner

*Primary Examiner*—Tom Dunn
*Assistant Examiner*—Christina Ildebrando
(74) *Attorney, Agent, or Firm*—Evenson, McKeown, Edwards & Lenahan, P.L.L.C.

(57) ABSTRACT

Flux residues from aluminium soldering fluxes composed of alkali metal metallates, especially fluoroaluminates of the alkali metals, in particular potassium and cesium, can be recycled by adding them to the reaction mixture used for the production of hydrogen fluoride from fluorspar and sulfuric acid or oleum. In this way the fluorine content of the flux residues becomes reusable, and the anhydrite which is produced can advantageously be used for conventional purposes.

16 Claims, No Drawings

RECYCLING OF FLUX MATERIAL

BACKGROUND OF THE INVENTION

The invention relates to the recycling of flux residues from soldering processes using solders composed of metal fluoroaluminates and fluorozincates.

As used herein, the term "soldering" includes both soft soldering and hard soldering (i.e., brazing).

In soldering, in particular of aluminium and aluminium alloys, fluxes composed of metal fluorometallates, e.g. composed of alkali metal fluorozincates and particularly of alkali metal fluoroaluminates, are used. Fluoroaluminates which contain potassium and/or cesium are particularly well suited. A considerable amount of the flux used for soldering is not consumed, but remains in the pipes, lines or apparatus. A further portion of the residues results from any cleaning of the soldered objects which may be carried out, from spent flux suspensions and from the regularly-performed cleaning of storage tanks. In the past these flux residues have not been re-used.

SUMMARY OF THE INVENTION

It is an object of the present invention to provide a process with which profitable re-use of the flux residues is possible.

This and other objects of the invention are achieved in accordance with the present invention by providing a method of recycling residue of an alkali metallate flux for soldering aluminum, the flux comprising at least one alkali metallate selected from alkali metal fluoroaluminates and alkali metal fluorozincates, the method comprising admixing the flux residue with fluorspar, and reacting the admixed fluorspar and flux residue with sulfuric acid or oleum to produce hydrogen fluoride and anhydrite.

According to a further aspect of the invention, the objects are achieved by providing a composition of matter useful as a reactant in the production of hydrogen fluoride, the composition comprising an admixture of fluorspar and a residue of an aluminum soldering flux comprising at least one alkali metallate selected from the group consisting of alkali metal fluoroaluminates and alkali metal fluorozincates.

In yet another aspect of the invention, the objects are achieved by providing anhydrite containing potassium sulfate and aluminum sulfate produced by treating a potassium fluoroaluminate containing flux residue according to the method described above.

The invention is based on the discovery that the flux residues can advantageously be added to the fluorspar, which is reacted with oleum to form hydrogen fluoride and $CaSO_4$.

DETAILED DESCRIPTION OF PREFERRED EMBODIMENTS

According to the invention, flux residues composed of alkali metals of fluoroaluminates or composed of alkali metals of fluorozincates are used as an additive to fluorspar in the production of hydrogen fluoride from fluorspar and oleum.

If a small quantity is added, the residues may be admixed with a more or less high water content as they occur. They may also be largely freed of water beforehand, e.g. in filter presses. The added flux residues are advantageously substantially free of water or used in the dry state, but may, if desired, also contain water of crystallization.

Advantageously, the flux residues are added in a quantity of up to 2% by weight, relative to their dry weight, preferably 0.35% by weight to 1% by weight, relative to the dry substance of the fluorspar, including the flux residues, as 100% by weight.

The process is particularly suitable for flux residues composed of potassium and/or cesium fluoroaluminates, such as $KAlF_4$, $K_2AlF_5$ or $K_2AlF_5$ hydrate. U.S. Pat. Nos. 4,670,067 and 5,318,764 disclose the production and use of such fluxes. The flux residues may also contain $ZnF_2$ which, according to U.S. Pat. No. 4,645,119, is included in the flux as protection against corrosion. Such flux residues are produced in particular when soldering aluminium or aluminium alloys.

Flux residues composed of potassium and/or cesium fluorozincate, as described in unpublished German Patent Application No. DE 199 13 111, may be used according to the invention, and of course also mixtures of fluoroaluminate and fluorozincate fluxes.

Optionally, the flux residues also may additionally contain alkali fluorosilicate, as may be the case for certain fluxes, see DE 196 36 897 and U.S. Pat. No. 5,785,770 (=EP 810,057). Japanese Patent Application No. JP 08-267229 discloses that fluxes of $AlF_3$ and $K_2SiF_6$ also produce usable soldering. The use of flux residues from this process, which do contain potassium ions, aluminium ions and fluorine ions, is likewise regarded as an embodiment within the scope of the present invention.

One advantage of the process according to the invention is that the procedure for production of hydrogen fluoride, does not need to be modified; it is possible to operate as described in the prior art.

Generic processes are disclosed, for example, in U.S. Pat. No. 3,919,399 (=DE 2,209,960); U.S. Pat. No. 4,010,245 (=DE 2,435,512); Swiss Patent No. CH 540,195 and U.S. Pat. No. 4,460,551 (=WO 82/03848). In these processes, fluorspar is reacted with sulfuric acid, or preferably oleum, in a heated reaction vessel, for example a rotary furnace. The reaction can be completed by heating the reaction mixture to temperatures of up to 350°. The hydrogen fluoride gas which is released is purified in a known manner. An additional, usable product is $CaSO_4$ (anhydrite). In this case, fluoroaluminates are converted into alum (or compounds containing potassium ions and aluminium ions as well as sulfate ions), zincates into zinc sulfate, and silicates into $H_2SiF_6$, which is expelled and worked-up. The alkali metal ions remain as sulfates in the anhydrite.

Further advantages of the process according to the invention include the fact that the flux residues are used as valuable materials, and the fact that the addition of the flux residues results in accelerated solidification being observed in the calcium sulfate which is produced.

$KAl(SO_4)_2$ hydrate or zinc sulfate, for example, is added to the anhydrite as an accelerator, so that a corresponding saving in terms of raw material can be achieved in this case.

The process according to the invention is carried out such that the desired quantity of flux residue is admixed prior to or in the rotary furnace in the known HF production procedure.

The invention further relates to fluorspar with added flux residues composed of alkali metals of fluoroaluminates or composed of alkali metals of fluorozincates or mixtures thereof, which may optionally additionally contain conventional additives such as alkali metal fluorosilicate.

The invention also relates to anhydrite having an additional cation content resulting from the use of flux residues composed of alkali metal fluoroaluminate, in particular potassium fluoroaluminate, and/or alkali metal fluorozincate, preferably potassium fluorozincate. Particularly preferred is anhydrite produced from fluorspar and sulfuric acid or oleum, which has an additional content of potassium ions, aluminium ions and optionally cesium ions and/or zinc ions in the form of sulfates, obtainable by using flux residues composed of potassium fluoroaluminate.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A method of recycling residue of an alkali metallate flux for soldering aluminum, said alkali metallate flux comprising at least one alkali metallate selected from the group consisting of alkali metal fluoroaluminates and alkali metal fluorozincates, said method comprising the steps of:

admixing the flux residue with fluorspar; and reacting the admixed fluorspar and flux residue with sulfuric acid or oleum to produce hydrogen fluoride and anhydrite.

2. A method according to claim 1, wherein the flux residue comprises at least one alkali metal fluoroaluminate selected from the group consisting of potassium fluoroaluminate and cesium fluoroaluminate.

3. A method according to claim 1, wherein a positive amount of flux residue of up to 2% by weight is admixed with the fluorspar based on the dry weight of the flux residue and the total solids content of the fluorspar and flux residue mixture.

4. A method according to claim 3, wherein from 0.35% to 1% by weight of flux residue is admixed with the fluorspar based on the dry weight of the flux residue and the total solids content of the fluorspar and flux residue mixture.

5. A method according to claim 1, wherein said flux residue is substantially freed of water prior to admixture with the fluorspar.

6. A method according to claim 1, wherein the flux residue comprises a predominant amount of alkali metal fluoroaluminate and at least one further alkali metal metallate selected from the group consisting of alkali metal fluorosilicates and alkali metal fluorozincates.

7. In the production of hydrogen fluoride by reacting sulfuric acid or oleum with fluorspar, the improvement comprising incorporating in the fluorspar prior to reaction with the sulfuric acid or oleum, a positive amount up to 2% by weight of a flux residue of an alkali metallate flux for soldering aluminum.

8. The improvement of claim 7, wherein said alkali metallate flux comprises at least one alkali metallate selected from the group consisting of alkali metal fluoroaluminates and alkali metal fluorozincates.

9. The improvement of claim 8, wherein said flux residue is substantially freed of water prior to incorporation in the fluorspar.

10. The improvement of claim 8, wherein said flux residue comprises a predominant amount of alkali metal fluoroaluminate and at least one further alkali metal metallate selected from the group consisting of alkali metal fluorosilicates and alkali metal fluorozincates.

11. The improvement of claim 8, wherein the flux residue comprises at least one alkali metal fluoroaluminate selected from the group consisting of potassium fluoroaluminate and cesium fluoroaluminate.

12. A composition of matter useful as a reactant in the production of hydrogen fluoride, said composition of matter comprising an admixture of fluorspar and a residue of an alkali metallate flux for soldering aluminum, said alkali metallate flux comprising at least one alkali metallate selected from the group consisting of alkali metal fluoroaluminates and alkali metal fluorozincates.

13. A composition of matter according to claim 12, wherein said composition comprises a positive amount of flux residue of up to 2% by weight admixed with the fluorspar based on the dry weight of the flux residue and the total solids content of the composition.

14. A composition of matter according to claim 13, wherein said composition comprises from 0.35% to 1% by weight of flux residue based on the dry weight of the flux residue and the total solids content of the composition.

15. A composition of matter according to claim 12, wherein the flux residue comprises at least one alkali metal fluoroaluminate selected from the group consisting of potassium fluoroaluminate and cesium fluoroaluminate.

16. A composition of matter according to claim 12, wherein the flux residue comprises a predominant amount of alkali metal fluoroaluminate and at least one further alkali metal metallate selected from the group consisting of alkali metal fluorosilicates and alkali metal fluorozincates.

* * * * *